April 3, 1956   D. H. KELLY ET AL   2,740,317
COLOR SELECTIVE OPTICAL INTERFERENCE COATINGS
Filed Aug. 13, 1951   6 Sheets-Sheet 1

Inventors
Donald H. Kelly
Frank C. Rock, Jr.
by Roberts, Cushman & Groves
attys.

Inventors
Donald H. Kelly
Frank C. Rock, Jr.
by Roberts, Cushman & Grover
Att'ys.

Inventors
Donald H. Kelly
Frank C. Rock, Jr
by Roberts, Cushman & Grover
attys.

United States Patent Office

2,740,317
Patented Apr. 3, 1956

2,740,317

COLOR SELECTIVE OPTICAL INTERFERENCE COATINGS

Donald H. Kelly and Frank C. Rock, Jr., Los Angeles, Calif., assignors to Technicolor Motion Picture Corporation, Hollywood, Calif., a corporation of Maine Application August 13, 1951, Serial No. 242,140

9 Claims. (Cl. 88—1)

Optical interference layers of dielectric material are now used for various purposes such as glare preventing, filtering, polarizing, and linking of light beams with or without spectral differentiation. In many instances, such layers are applied to their surfaces in such a manner that optical properties of the carrier body can be disregarded; if they have heretofore been uesd in a manner which does not permit disregarding of the carrier such as enclosure between glass bodies, difficulties caused by such use did not arise apparently due to conditions which introduce detrimental phenomena only to an extent that is negligible in such use. We found however that certain phenomena become quite important if enclosed coatings of optically interfering layers, or generally speaking coatings on carriers of certain types, are incorporated in apparatus with particularly exacting performance requirements such as light transmission and reflection with a minimum of intensity losses and optimum uniformity over a wide field.

It is one of the main objects of the present invention to provide optical interference coatings of high efficiency and adaptability to various purposes, independently of the carrier structure to which they are applied; to provide such devices which reflect or transmit light with a minimum of intensity loss due to undesirable reflection or polarization phenomena; to provide, as a particularly useful specific embodiment, beam linking devices with embedded interference coatings for use in color photography, color television and related apparatus, which devices can be constructed to reflect desired amounts, up to essentially the theoretical maximum, of light in certain discrete bands or regions of the optical spectrum and similarly transmit the light in other regions; and to provide such systems which produce higher saturation or purity of color than heretofore possible, particularly also in the transmitted beam.

Other objects are to provide beam linking systems suitable for color analysis as well as synthesis in photographic, television and related apparatus, which transmit as nearly as possible or desired all of the light in a closely defined region of the optical spectrum, while similarly reflecting the light throughout another spectral region closely adjoining the first; and to provide such a system which incorporates within an optical cube a multiple layer structure of various dielectric materials of thicknesses defined by fractions of wave lengths or multiples thereof, these materials being of such nature that they can be practically coated by commercially feasible techniques, can be controlled as to configuration and other characteristics particularly suitable for the above purposes, and are compatible with each other as to chemical and physical properties.

Still other objects are to provide light dividing and combining devices of the above indicated type which link a beam of essentially white light with colored component beams particularly suitable for purposes of color photography and color television, namely in the blue, green and red spectral ranges or combinations thereof; to provide optical interference coatings for specific purposes, such as complex coatings capable of reflecting up to more than 90 per cent of the blue and red light while transmitting substantially all the green light, or optical interference coatings with controlled absorption, particularly also as applied to prisms with intersecting coatings.

An optical system according to the invention comprises a supporting body which affects the ray geometry of light transmitted therethrough and carries, on a surface preceded and backed in the light path by the body, a plurality of superimposed optical interference layers of media having alternatingly different refractive indexes, respectively, which indexes are at least substantially equal to or higher than the refractive index of the body. In another aspect, the invention is concerned with an optical system for linking image carrying beams comprising a light transmitting body of given refractive index having exterior beam admitting and emitting surfaces, and juxtaposed internal surfaces inclined to an admitting surface, and between the internal surfaces a coating or coatings which include a plurality of optical interference layers of media having alternatingly different refractive indexes, the index of one of said media being essentially equal to or higher than that of the body, and the index of the other medium being higher than that of the first medium.

In another important aspect, one of the media is lead fluoride, and the other zinc sulfide; these materials may be substituted by any pair of media one of which has an index of refraction essentially equal to or higher than the index of the supporting body, and the other an index higher than that of the first medium. Titanium dioxide for example was found suitable as a substitute for zinc sulfide. Regarding the above specifically identified media it is assumed that the body consists of glass, for example light barium crown glass with an index of refraction of 1.5725, which is approximately equal to the index of the lead fluoride layer as determined for purposes of the present invention, or somewhat lower. It is however understood that the indexes of refraction of evaporation coated layers vary to some degree, depending upon origin of the medium and technique of application, and that these media have to be selected, in accordance with the principles of the invention, depending upon the index of the supporting body and the manufacturing procedure.

In another aspect of the invention, one coating is applied to an internal surface of an optical body and constructed to reflect 80 per cent or more of the unpolarized incident light in a discrete wave length region thereof and a second coating is superimposed which reflects 80 percent or more of the unpolarized incident light in another discrete wave length region. The body can be substantially a cube with internal dividing surfaces extending diagonally between two opposite edges of the cube. All layers may be coated on one of the surfaces and then cemented to the other, or one coating may be applied to one and the other coating to the other surface, the bodies being then cemented with contacting coatings. Intersecting surfaces can be similarly provided with optical interference coatings, it being always understood that none of the layers of the coatings has an index of refraction essentially lower than that of the supporting body.

Other objects, aspects and features will appear, in addition to those contained in the above statement of the nature and substance including some of the objects of the invention, from the herein presented outline of its theoretical basis, and from the following description of typical practical embodiments thereof illustrating its novel characteristics. This outline and description refer to drawings in which—

In the following theoretical exposition and description of specific embodiments of the invention, certain terms are used to convey the following meanings.

An "optical interference coating" (or "coating" for short) consists of at least two interference "layers" of transparent media of different index of refraction. Coatings are applied to a surface or surfaces of a carrier or "supporting body" of optically suitable material constituting a "dense front" or "backing," and link several light beams of different optical properties such as wave length; an example is a spectrally selective coating which links a white beam with several colored beams either by dividing the white beam as in a camera, or by combining colored beams as in projection apparatus.

The term "record" is herein used for tangible reproductions or representations of pictures or symbols in any medium such as metallic silver, dye, ink, or defined by molecular or atomic modification such as latent silver halide records, vectograms, fluorescent layers including electron beam controlled emitters, and capacity patterns; the term "image" on the other hand is used for the "optical counterpart of any object produced by any optical system" (Webster). In this context it will be understood that the concept "imaging" is not restricted to imagery in a single direction, but includes the imaging of one pattern upon another in either direction, by an "image carrying beam." "Surface" is used essentially in its geometrical connotation, that is a plane or curved two dimensional space. An "interface" is a surface that separates two media other than air, of different indexes of refraction. "Picture surface" means a surface wherein either a record or an image, in the above sense, appears, can be detected, or is otherwise effective; this includes projection screens, photographic film records, picture screens of electronic scanning devices such as television sending or receiving tubes, and actual object fields. A "linking surface" associates, either by way of combining or analyzing, a plurality of image carrying beams.

The term "spectrum" as herein used involves not only continuous portions, bands or lines of the visible spectrum, such as the blue, green and red ranges employed in color photography or color television, but also invisible ranges in so far as they can be utilized in system of the general type herein dealt with such as the infrared and ultra violet ranges; this spectrum is therefore referred to as "optical spectrum."

Optical interference coatings carried by flats, that is plates with parallel surfaces, are practical in many instances but unsatisfactory for some useful purposes suggested by these coatings. Such purposes are for example color analysis and synthesis in photography, television and other fields where beam linking structures are expected to transmit as nearly as possible all of the light of a closely-defined region of the optical spectrum while reflecting as nearly as possible all of the light in another closely adjoining region. Beam linking interference coatings of the open mirror type are in many cases unsuited for such and other applications, among other reasons because they introduce unequal glass paths and are mechanically unsatisfactory. Optical prisms with internal optical interference coatings which are inclined to a light admitting surface are preferable to flats or plates where high precision and optimum image quality are required.

We found however that interference coatings designed for plates performed poorly if applied to carrier bodies other than flats, for example if embedded in optical cubes, and in some such instances are even unworkable.

While it was recognized that optical interference layers with essentially free light incidence in air on the one hand, and with incidence through glass bodies on the other hand (for example as applied to flats and prisms respectively) are not equivalent, it was assumed that expedients necessary to produce similar performance in either instance involve nothing else than changes of thickness and number of layers, and that the optimum refractive indexes for the layers are independent of the medium and configuration of the body carrying the coating. This assumption we found to be untenable for the following reasons.

Figure 1:
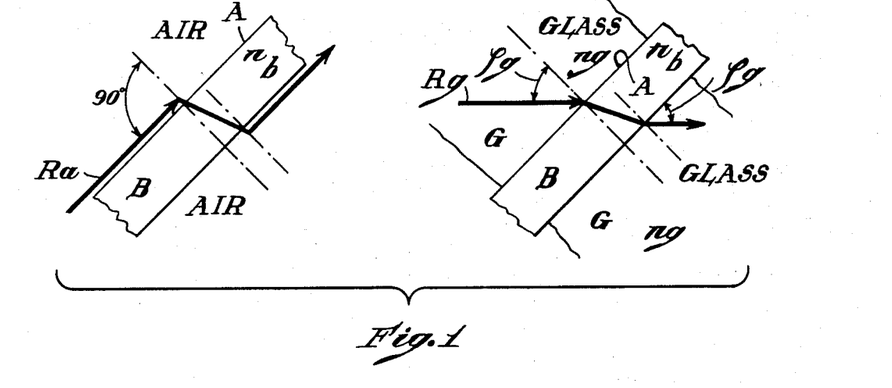
Figs. 1 and 2 are diagrams illustrating certain ray paths from air and glass respectively into and out of a coating medium.

As well known and indicated in Fig. 1, a grazing ray $R_a$ incident at 90° through air on a face A of a body B with index of refraction $n_b$ corresponds with regard to optical phenomena in body B to a ray $R_g$ incident at a much smaller angle $\varphi_g$ through a denser medium G such as glass with index of refraction $n_g$. The relation of the angles is determined by the relative index values $1/n_b$ and $n_g/n_b$ respectively. It may be assumed by way of example with reference to Fig. 2 that an optical interference coating C is embedded in the prism P1, P2 of a conventional camera system including objective L, according to U. S. Patent No. 2,072,091 dated March 2, 1937. The angle $\varphi_g$ will in this example be about 40°. Ray $R_g$ (compare Fig. 1) therefore intersects a line S parallel to the system axis at an angle of about 5°. Having in mind that ray $R_g$ is optically equivalent to the grazing ray $R_a$ (Fig. 1) in air, it follows that the performance of an interference coating involving rays at angles $\varphi_g$ (Fig. 1) greater than 40° in a cube system according to Fig. 2 cannot necessarily be duplicated with the same coating on a plate, because angles greater than $\varphi_g$ in glass may correspond to imaginary angles $\psi$ in air. Thus, angles greater than 40° in glass may well include the axial beam straight through lens system and cube, parallel to S. Thus, all ray angles in an interference coating which is embedded in glass at an angle to the entrance face become much greater in terms of corresponding angles in a coating bordering on air. Consequently, phenomena depending on angles of incidence and refraction are bound to be fundamentally different for coatings bordering on air and glass respectively. Indeed, optical interference coatings which are quite satisfactory when bordering on air can be and often are deficient for rays incident within glass at angles that are otherwise desirable or prescribed by the optical device into which the coating is incorporated.

With regard to comparative performance of angularly embedded and plate carried interference coatings it should be kept in mind that the behavior of a coated flat is unchanged regardless of the side of the plate on which the coating is carried. It is irrelevant whether the light goes through the plate after (first surface mirror) or before (second surface mirror) striking the coating, so long as the faces of the plate are parallel. Similar reasoning applies to the angularly embedding or enclosing bodies involved in the present invention; these affect the performance of the coating thereon or therein whenever the ray path within the coating is affected by the material and angular geometry of such body.

The present invention is based on the recognition that the performance of coatings applied to carrier bodies other than flats depends largely upon certain phenomena which involve specific ray angles as governed by the indices of refraction of the interference layers as well as these bodies.

These phenomena are mainly total reflection, and polarization at reflecting and refracting interfaces, herein called reflective polarization. Total reflection occurs for rays passing from higher to lower index media and located outside a cone defined by the "critical angle" of incidence. Reflective polarization involves reflected as well as refracted light, upon passing from lower to higher index media as well as from higher to lower index media. These phenomena, although well known to those skilled in the art, require particular attention in their somewhat unusual application to the present invention, and will therefore be shortly recapitulated for that purpose with reference to Fig. 3.

Figure 3:
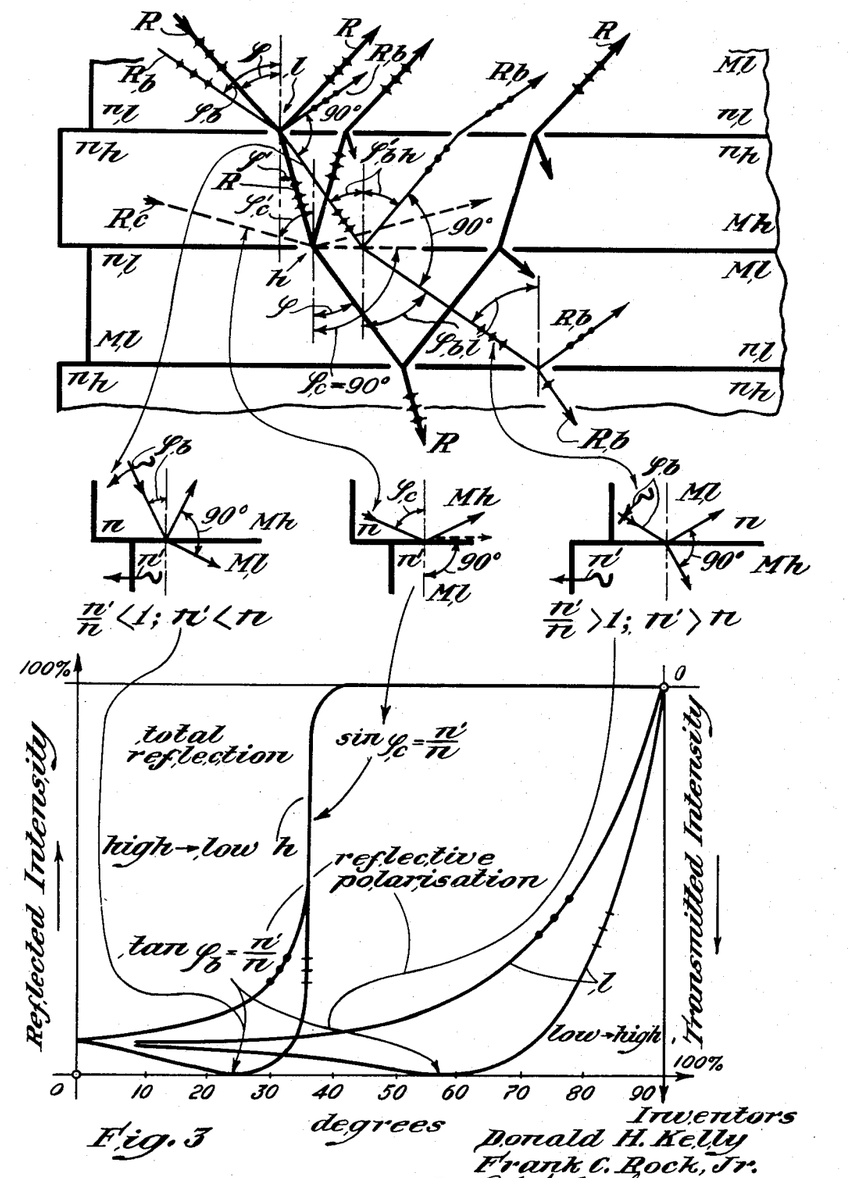
Fig. 3 is a diagram illustrating the phenomena of total reflection and reflective polarization, as involved in the present invention.

In Fig. 3 a ray R passes from dense medium $Mh$ with index of refraction $n_h$ into rare medium $Ml$ with index $n_l$. It is at $h$ reflected at the angle of incidence $\phi'$ and refracted at angle $\phi$. As $\phi'$ approaches $\phi_c'$ for ray $Rc$, total reflection begins for all rays beyond the cone defined by the critical angle of incidence. $\phi_c'$ for total reflection for $\phi_c = 90°$.

The critical angle is defined by the relation sin $\phi_c = n'/n$ where $n'$ is the index of the rarer medium, and $n'/n$ the relative index. Thus, the critical angle decreases with increasing $n$, or decreasing $n'$, generally speaking with increasing difference between $n$ and $n'$. Total reflection does not take place upon passing from rarer to denser medium such as at point $l$ of Fig. 3, where sin $\phi_c$ is always less than unity.

Further in Fig. 3, a ray R of unpolarized light is at $l$ incident and reflected upon $Mh$ at angle $\phi$, and refracted in $Ml$ at $\phi'$. Except for the case where $\phi = 0°$, both reflected and refracted beams are partially plane polarized as indicated by dots and cross dashes for planes of vibration perpendicular and parallel to the plane of incidence (the paper plane), respectively. As the incident ray R approaches the "polarizing angle" $\phi_b$ (determined by Brewster's law) as indicated at $Rb$, the reflected beam becomes more highly polarized; at that angle all reflected light is polarized perpendicular to the plane of incidence. It will be noted that the polarizing angle is within the critical angle, as indicated in Fig. 3. The polarizing angle is defined by the relation tan $\phi_b = n'/n$, where $n$ is always the index of the incident (first) and $n'$ is the index of the refracting (second) medium. This relation occurs when the angle between the reflected and the refracted rays is 90°. Combining the above expression describing the polarization at each interface, with Snell's law, an expression can be derived relating the polarizing angle in the carrier medium to the indexes of refraction of the two materials. This expression is sin $$\phi_b = nn'/n_g\sqrt{n^2+n'^2}$$

wherein, as mentioned above, $n'$ is the index of the material following that with index $n$. It can be seen that in general $\phi_b$ can be increased by raising the index of refraction of either material. The diagram of Fig. 3 shows the polarization relationship at each interface, the curves marked $h$ referring to reflection from a high to low index interface such as that marked $h$, and the curved marked $l$ referring to low to high index reflection such as at interface $l$. Corresponding angles are marked $\phi_{bh}$ and $\phi_{bl}$. Each curve has two branches corresponding to the two planes of polarization as indicated by dots and cross dashes corresponding to those applied to the rays in the upper portion of this figure. The relation of polarization angle and indexes is indicated with waved arrows at diagrams "$l$" and "$h$." The diagram marked "$hc$" relates to total reflection at interface $h$.

Optical interference coatings applied to plates are not detrimentally affected by the above indicated phenomena. The refraction angles for such plates are such that total reflection is impossible and the polarizing angle quite steep. Thus, neither total reflection nor complete reflective polarization affect optical interference coatings carried by flats. However, for the reasons pointed out above, incidence within a dense body such as a prism causes the cones defined by the critical angle $\phi_c$ and by the polarization angle $\phi_b$ to become real and much narrower respectively, and the limiting conditions considerably shifted, with an effect explained by reference to Figs. 4, 5 and 8.

Figure 4:
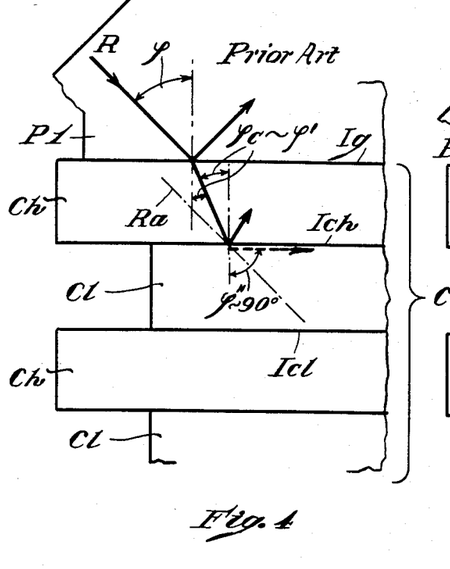
Figs. 4 and 5 are diagrams illustrating the total reflection phenomenon as involved in the invention.

In Fig. 4, $Ig$ is an interface between a glass body (such as P1 of Fig. 2) and a comparatively dense optical interference layer $Ch$. Another interface $Ich$ separates the high index layer $Ch$ of an optical interference coating C from a low index layer $Cl$. Interface $Icl$ separates layer $Cl$ from another high index layer $Ch$, and so forth. The optical interference layers are of conventional design, with the index of the $Cl$ layers lower than that of the glass body P1; as symbolically indicated by the amount of extension at the left side of Fig. 4. A ray R subtends with the perpendicular on $Ig$ an angle $\phi$. Ray R is reflected and refracted at $Ig$ and again at $Ich$. There can be no total reflection at $Ig$ because the index of $Ch$ is higher than that of P1 but, since the index of refraction of layer $Cl$ is considerably lower than that of $Ch$, the angle $\phi'$ approaches the critical angle $\phi_c$ with $\phi''$ approaching 90°. Thus (as also indicated in Fig. 4 by the line $Ra$ parallel to ray R in glass body P1) any rare layer with an index lower than that of glass can cause total reflection of a ray which passes interface $Ig$ from glass to the first dense layer $Ch$, which as customary for other reasons, is usually the high index layer.

Figure 5:
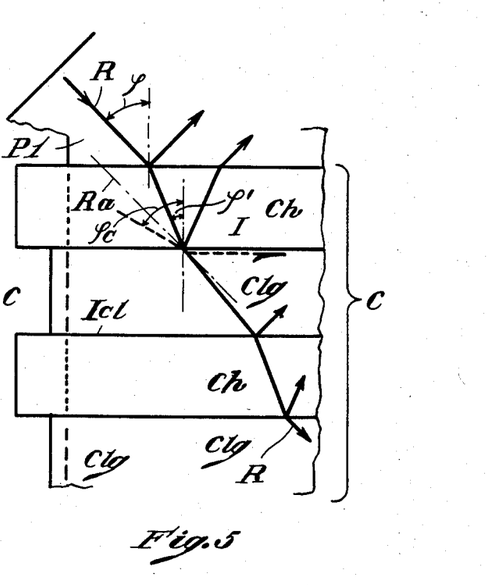

In accordance with the invention, the index of refraction of the rarer layers $Clg$ is at least as high as that of the glass body P1, as indicated in Fig. 5. In that figure, $\phi_c$ again indicates the critical angle of total reflection. It will be evident from Fig. 5 as compared to Fig. 4, that in this structure the critical angle $\phi_c$, safely avoided by the steepest, most unfavorable rays approaching in glass, can never be reached within the interference coating C, and total reflection thus safely avoided. The only way in which total reflection can occur is for the entering ray to encounter a layer whose refractive index is lower than that of the glass cube itself. It will be understood that equality of the indexes of body P1 and layers $Clg$ is not very critical and that, having in mind the limited choice of dielectric coating media, total reflection can often be safely avoided if the low index layers $Clg$ are of a material which has a slightly lower index than the front body. In Fig. 5, the left hand edge of the layer section again indicates the index relationships. It is evident that, while raising the index of the rare layers in accordance with the invention will enlarge the critical angle and hence the field of view, alteration of the index of the dense layers has no effect upon the total reflection properties of the optical interference structure including a dense carrier such as prism P1, P2 shown in Fig. 2.

Figure 6:
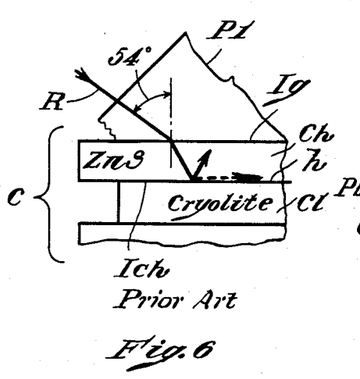
Figs. 6 and 7 are schematical sections of prisms with selective reflectors such as in Fig. 2; illustrating the control of total reflection according to the invention.
Figure 7:
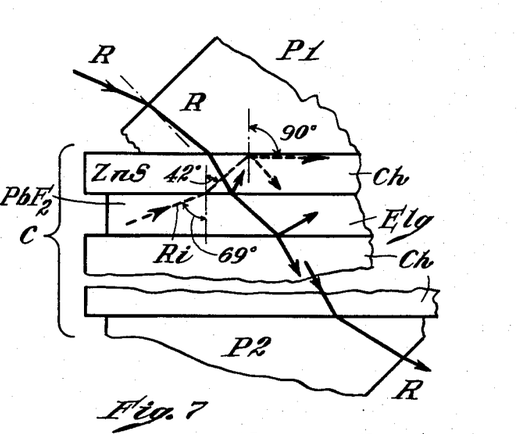

Figs. 6 and 7, corresponding to Figs. 4 and 5 respectively, present practical embodiments of interference coatings according to the prior art (Fig. 6), and in accordance with the invention (Fig. 7). In Fig. 6, layers $Ch$ are of zinc sulfide and layers $Cl$ of cryolite. A ray R incident at about 54° at the first interface $Ig$ is totally reflected at the second interface $Ich$, and, if the succeeding layer is thick enough, eliminated from further progress through and interference selection within the coating C. In Fig. 7, the practical functioning of an arrangement according to the invention is indicated by ray R as in Fig. 5, and also by a hypothetical inverse ray $Ri$ generated within the multilayer film which would be totally reflected by the glass itself before reaching 90° in the low index layer $Clg$ which is in this instance of lead fluoride having an index of refraction slightly higher than that of the glass prism P1, as will be discussed more in detail below.

The control of detrimental effects due to polarization will now be explained.

Figure 2:
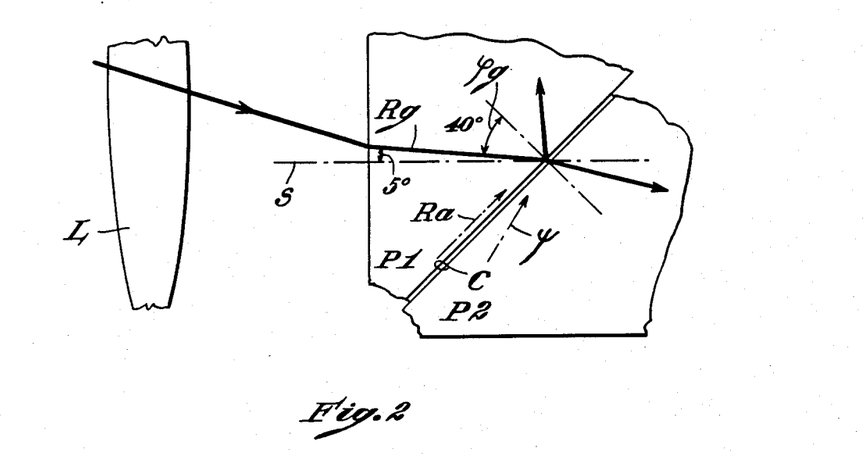

Referring to Figs. 2 and 3, it will be noted that in order to improve the field angle, the polarization angle $\phi_b$ should be as large as possible and that it is more important than the critical angle because it occurs closer to the optical axis of the system in which the dense carrier body such as the front component of a cube prism is used. It is further apparent from Fig. 3 that, as the angle $\phi_b$ is approached, less and less light vibrating perpendicularly to the plane of incidence will be reflected as the ray progresses. Thus at $\phi_b$ there is a limiting value or ceiling of 50 per cent for an infinite number of layers, of the peak reflection of unpolarized light over a considerable wave length region. While, generally speaking, an increase in the number of layers improves the reflection intensity, this ceiling exists no matter how many layers are used. This is due to the fact discussed above with reference to Fig. 3, that the reflection factor at all the interfaces is zero for the plane of incidence component of rays at the polarization angle. This phenomenon merely repeats itself throughout the coating so that any increase in thickness or number of layers has no effect thereon whatever.

Figure 8:
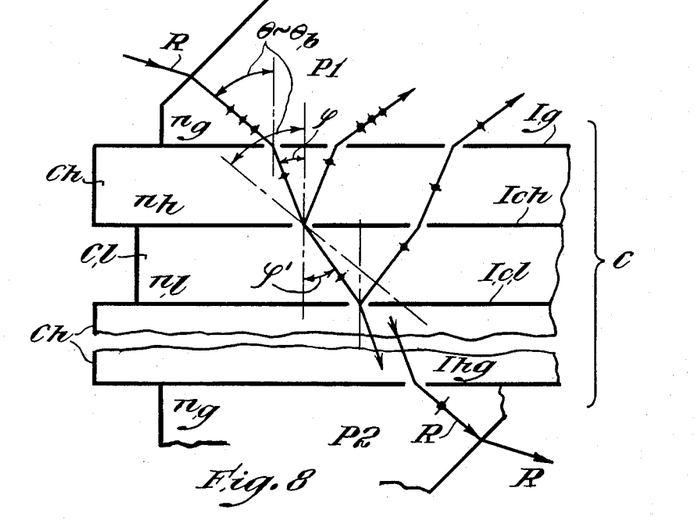
Fig. 8 is a diagram similar to Fig. 5, illustrating the polarization phenomenon as involved in the invention.

Fig. 8 further illustrates this situation. A ray R approaches coating C at an angle $\theta$, is reflected at interface $I_g$, refracted toward $I_{ch}$ and so forth until it emerges at $I_{hg}$. The angle $\theta$ is determined by the relation $$\sin \theta_b = n_h n_l / n_g \sqrt{n_h^2 + n_l^2}$$

wherein $n_g$, $n_h$ and $n_l$ are the indexes of glass, high index material and low index material, respectively. This angle $\theta_b$ is Brewster's angle for the ray incident in glass on face $I_g$. Thus, if angle $\theta$ is so selected that angles $\phi$ and $\phi'$ are always smaller than $\theta_b$, there will always be reflected light with a non-polarized component in the reflected beam, the exact proportions of polarization in the respective planes being governed according to Fig. 3.

Figure 9:
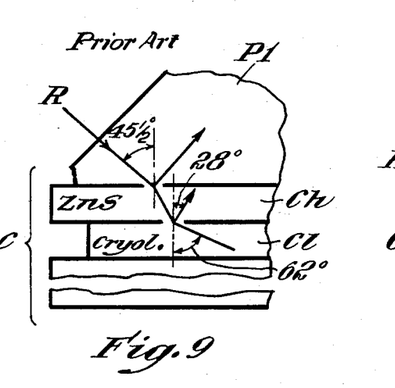
Figs. 9 and 10 are schematical sections of prisms such as in Figs. 6 and 7 respectively, illustrating control of reflective polarization according to the invention.
Figure 10:
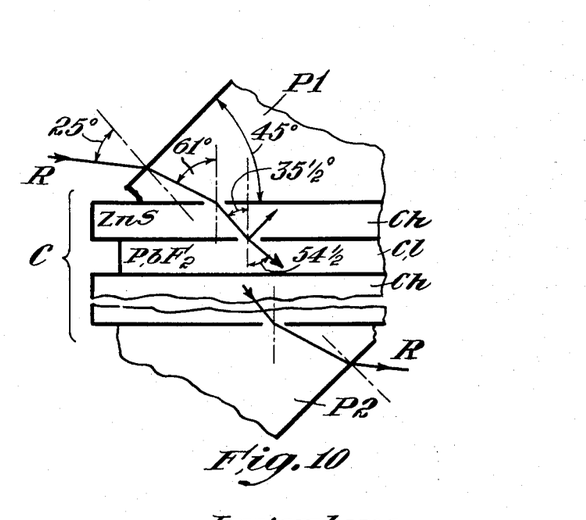

Practical examples illustrating this situation are schematically presented in Figs. 9 and 10 which correspond to Figs. 6 and 7 illustrating the total reflection situation.

In Fig. 9, the layers $C_h$ and $C_l$ of a conventional coating are again zinc sulfide and cryolite, respectively. The ray R is refracted at the first interface and reflected at the second interface at an angle of 28°. The refracted beam leaves this interface at an angle of 62°, which results in an angle between reflected and refracted rays at the second interface of 91° which results in almost complete polarization of the reflected beam at this and all following interfaces, with the above discussed detrimental ceiling upon peak reflectance. In Fig. 10 the structure of which is identical with that of Fig. 7 with zinc sulfide and lead fluoride as high and low index layers, respectively, the angle between reflected and refracted rays is about 73°, safely removed from the 90° angle which, according to Brewster's law, results in total polarization.

The polarization angle is a function of both high and low index materials as pointed out above and, to the extent that the geometry of the carrier bodies determines the angles within the coating, to a slight extent of the glass index. In accordance with the invention, the polarization angle is increased in order to improve the available field, by appropriately selecting the indexes of refraction of the interference layers. As discussed with reference to Fig. 3, increase of the index of either, or both, dense and rare layers will increase the polarization angle $\phi_b$. As indicated by the above equation for sin $\phi_b$, by far the greatest improvement within the available range is obtained by raising the index of the low index material. In general, if the index of the low index material is made considerably greater than the index of the glass prism, total reflection can be entirely eliminated as explained above, and the polarization angle increased beyond the useful field angle throughout which high peak reflections are desired. However the increased index of the low index material results in decreased reflection for a given number of layers so that, unless the difference between the indexes of the two bordering media is increased by also increasing the index of the high index medium, more layers will be required. Otherwise, that is apart from the desirability of keeping the numbers of layers down if at all possible, the polarization can theoretically be decreased by raising either the low or high index. However in order to keep down the number of layers, it is in many instances most advantageous to select the low index just high enough to eliminate total reflection and to increase the high index to obtain an optimum polarization situation. There is a practical limitation on the increase of the high index due to chemical and physical properties of the available dielectric materials, so that if the amount by which the low index must be raised to avoid total reflection results in an unfavorably low relative index $n'/n$ and thus becomes less favorable, a higher number of layers for each coating has to be accepted. In other words, increasing the low index although important has a disadvantage. The advantage is that the higher the low index is above that of glass the less troublesome is the polarization difficulty; the disadvantage of increasing the low index is that it shortens the gap between the two indexes and therefore increases the number of layers required to afford a given amount of reflection. Thus, as above pointed out, it is generally speaking more advantageous to make the low index as close as possible to that of glass, just enough to overcome the total reflection difficulty, and to make the high index material as dense as possible in order to overcome the polarization difficulty.

Improvement to any desired degree is obtainable by increasing the index of the dense medium so far as permitted by the materials available. Some of these (such as antimony sulfide) are generally speaking satisfactory, but have absorption bands which prevent their use for work in the visible spectrum. We found that zinc sulfide is quite satisfactory as the high index medium, and lead fluoride as the low index medium.

The use of the last mentioned material, namely lead fluoride, as a well suitable low index medium is based on the discovery, within the frame of the present invention, that its effective index of refraction is about 1.68, which comes very close to the index of glass which is well suitable for prisms of the type used in the practical embodiment to be described herein below. Lead fluoride has a crystalline index between 1.8 and 1.9 and was therefore believed to be a high index material. Its use as such is indeed repeatedly suggested in the prior art. We discovered however that its refractive index is only about 1.68 in the evaporated state that is when applied as interference layer, and that it can therefore be used as low index material. It is especially suited for that purpose in many practical instances because it is compatible with zinc sulfide, these two materials providing fairly favorable conditions as indicated by Figs. 7 and 10. These two dielectric media also lend themselves very well for evaporation with exact thickness as well as wedge control.

Figure 11:
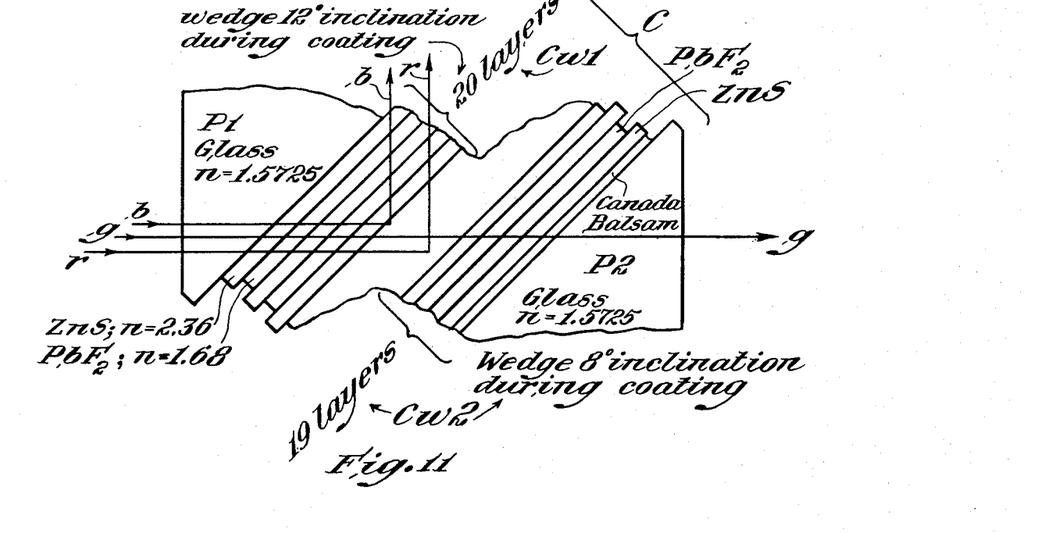
Fig. 11 is a schematical section through a specific embodiment of the invention.

Fig. 11 gives all essential details of a selectively reflective prism according to Fig. 2, incorporating the present invention for dividing a beam of white light into a component beam of reflected blue and red light and little green light, and a component beam of transmitted green light. It will be understood that the layer is defined by the relation $nt = z\lambda/4 \cos \theta$, wherein $z$ is an odd integer, $\lambda$ is the wave length of the light to be refracted, $n$ is the refractive index, and $\theta$ is the angle of refraction within the respective layer.

Figure 12:
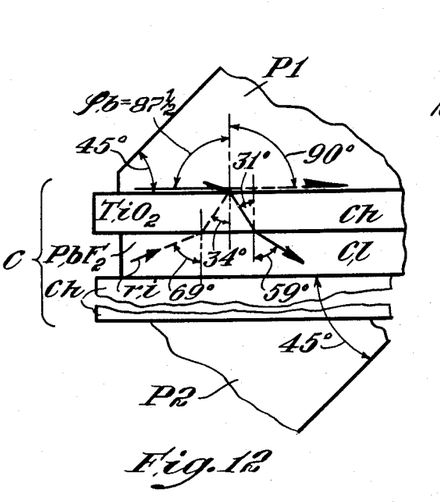
Fig. 12 is a schematical section similar to Figs. 7 and 10 illustrating control of total reflection and of polarization in another embodiment of the invention.

The materials zinc sulfide and lead fluoride can be appropriately substituted. For example instead of zinc sulfide, titanium dioxide can be used and instead of lead fluoride, silicon monoxide. The combination of lead fluoride with titanium dioxide produces an even more marked improvement than that of zinc sulfide and lead fluoride. With high index layers of titanium dioxide and low index layers of lead fluoride, not only the critical angle but also the polarization angle disappear fully, as indicated in Fig. 12, which is similar to Figs. 7 and 10. For this combination of optical interference layers, the polarization angle in glass is 87½°. Since the critical angle at the air to glass surface of a cube as in the previously described embodiments is 40° (compare Fig. 2) a completely polarized ray reflected by the film would strike the cube face at an angle of 2½° greater than the critical angle at this surface. This condition is indicated by the hypothetical ray originating within the coating shown in Fig. 12 at R$i$. The light thus cannot get into or out of the cube at the polarization angle. Since, further, the index of the lead fluoride low index layer is still slightly greater than that of glass, total internal reflection at the coating interfaces is nonexistent. Thus the use of titanium dioxide and lead fluoride layers completely eliminates both factors which limit the angle of view for saturated colors in the optical cube.

It has been previously suggested to use zinc sulfide or lead fluoride as high index, and cryolite or magnesium fluoride as low index layers. All these combinations are unsatisfactory with regard to total reflection as well as polarization. Particularly the previously suggested use of lead fluoride as high index layer as contradistinguished from the use of that material as low index layer according to the present invention, leaves the total reflection angle unchanged whereas the polarization angle instead of being steepened is actually changed the wrong way so that, while the reflection is limited to 50 per cent at 8° on one side of the field, the transmission is limited to zero at 14° on the other side. This is possibly the most unsatisfactory optical cube that could be conceived from the viewpoint of producing fields having fairly saturated color.

In order further to demonstrate the effect of structures according to the present invention, the reflection properties of several practical embodiments will now be shortly described in comparison with a light dividing coating of conventional type.

Figure 13:
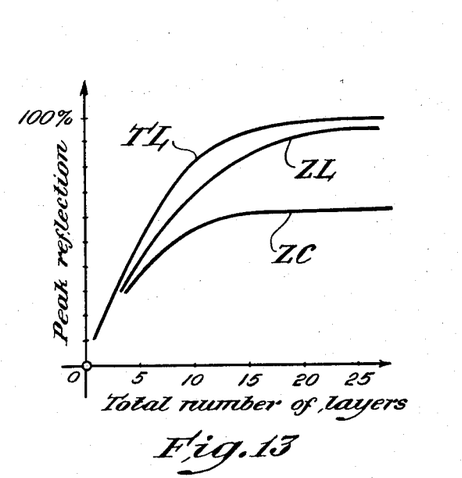
Fig. 13 is a comparative diagram of performance characteristics.

In Figure 13, peak reflection values of selectively reflective coatings within prisms are plotted against the number of layers (uneven because in these examples a high index layer is next to each glass face) for three different combinations of materials. The conventional zinc sulfide cryolite combination according to Figs. 6 and 9 wherein the index of the rare layers (cryolite) is lower than that of the glass is plotted at ZC, whereas two combinations according to the invention are plotted at TL and ZL. Curve TL refers to a structure according to Fig. 12, with titanium dioxide and lead fluoride for the high and low index layers respectively. Curve ZL is derived from a structure according to Figs. 7, 10 and 11 with zinc sulfide and lead fluoride layers. It will be noted that the peak reflection of the zinc sulfide-lead fluoride combination rises much more rapidly than that of the zinc sulfide-cryolite combination even though its index difference is smaller. Because the polarization angle of the zinc sulfide-cryolite combination is 45 and ½°, and these curves were drawn for light parallel to the axis of the lens system, the cryolite combination continues to rise slowly beyond 50 per cent but with 27 layers it is only 55 per cent, whereas the lead fluoride combination reflects more than 90 per cent with 17 layers. Moreover, the peak reflection values of cubes made with the lead fluoride-zinc sulfide combination are fairly constant for a reasonable range of angles of view while those of the cube with cryolite layers change radically in the vicinity of the polarization angle. The titanium dioxide-lead fluoride combination is even better, offering total freedom from polarization and a comparatively much smaller number of layers furnishing maximum reflection.

It will thus be seen that, while structures comprising layer material having an index of refraction substantially lower than that of the support such as glass are satisfactory for certain purposes for which flat plate supports can be used or for which the angle at which the coating is embedded in prism type systems can be restricted to certain values, interference coatings according to the present invention are superior in that they not only permit large field angles but provide better color selectivity by considerably increasing the reflection peak for a given number of interference layers. This will now be demonstrated with reference to Fig. 14 which presents a so-called magenta reflector with superimposed red and blue reflecting component coatings or layer groups. This structure presents, due to the present invention, a considerable improvement over previously suggested analogous devices, especially insofar as the characteristics of earlier coating structures, if applied to prisms, hold only for certain angles of embedding, whereas those of coatings according to the present application prevail over a comparatively very wide field within the range of angular geometry for which previously suggested coating materials were unsatisfactory.

Figures 14, 15:
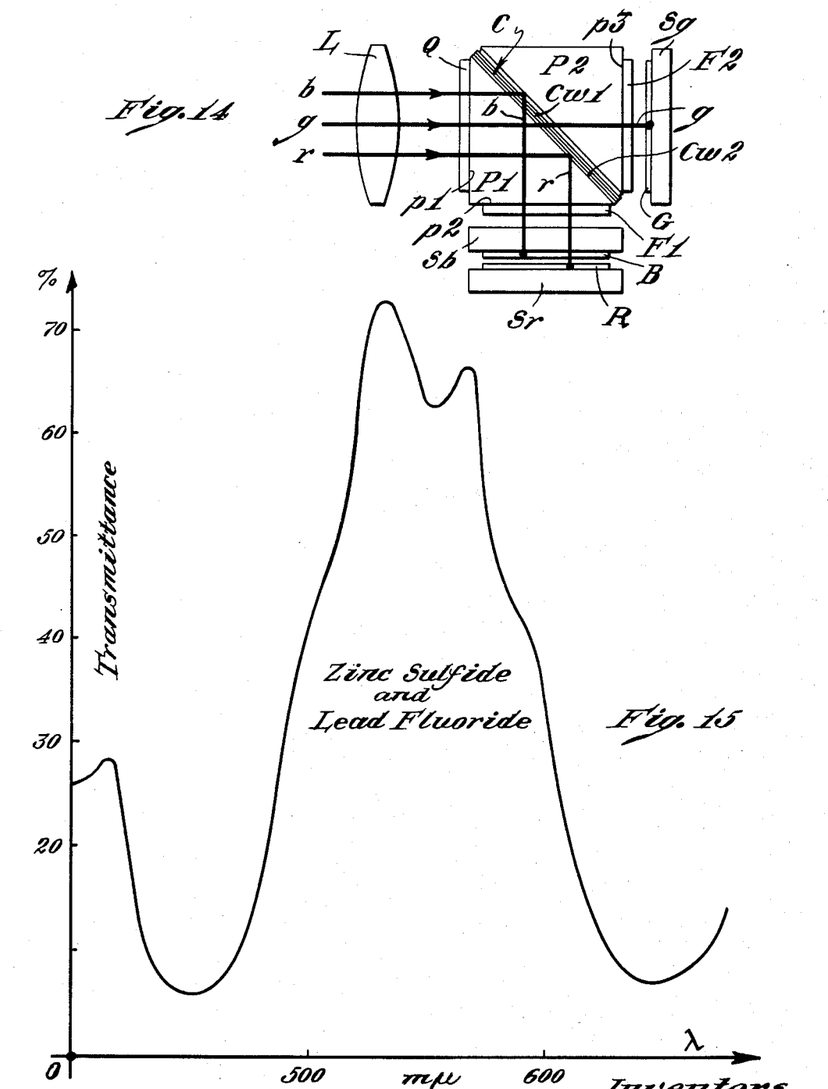
Fig. 14 is a diagrammatic cross section of a dichroic prism according to the invention.
Fig. 15 is a diagram illustrating the performance of a prism according to Fig. 14.

Fig. 14 shows a lens system L, and a prism cube with components P1 and P2 having light transmitting outer surfaces $p1$, $p2$ and $p3$ and an inner dividing surface C which consists of two layer groups C$w$1, C$w$2 of the type described above with reference to Fig. 11. The transmitted beam $g$ records the green aspect image on an emulsion G on support S$g$, whereas the reflected beams $b$ and $r$ record the blue and red aspect images on the emulsion B and R supported on S$b$ and S$r$ respectively. A quarter wave plate Q is preferably inserted between lens and prisms systems. Filters F1 and F2 can be inserted between prism and apertures respectively, if it should appear desirable to modify the color selectivity or cut-off wave length of the spectral range in the respective beams.

Fig. 15 indicates the improved optical characteristics of a device according to Fig. 14, having been obtained at a field angle which is fully adequate for the objective lenses in use for practical color cinematography. In this figure, the transmittance of unpolarized light is plotted versus wave length, and it will be noted that this performance compares very favorably with that of previously suggested devices of similar general type.

While the herein described embodiments, used in image forming optical systems, are embedded in carrier bodies of the same refractive index with coatings at 45° to the system axis, it will be understood that for certain purposes such as in non-image forming optical systems, the indexes can be different in which case the index of the low index layers of the coating has to be essentially equal to the higher carrier index, and it will also be understood that the coating can be intersected at different angles by external surfaces of carrier bodies.

It should be understood that the present disclosure is for the purpose of illustration only and that this invention includes all modifications and equivalents which fall within the scope of the appended claims.

We claim:

1. A color selective optical system for producing reflected and transmitted light beams each containing a substantial amount of non-polarized light, comprising a light-transmitting body of a certain refractive index having two surfaces at a substantial inclination to each other, one surface serving as an entrance face for receiving rays inclined thereto within a comparatively wide range of angles of incidence, and the other surface carrying an optical interference coating, said coating having a plurality of alternate layers of optical media of respectively high and low refractive indexes, for reflecting light within one spectral range and for transmitting light within another spectral range, the refractive index of the optical medium of each low index layer being greater than said refractive index of said body, and the refractive index of the optical medium of the high index layers being substantially higher than that of said low index medium, the interference layers with said indexes greater than the index of said body reflecting a beam within said one spectral range and transmitting a beam within said other spectral range, essentially without total reflection, and at angles smaller than the angles of total reflective polarization; whereby the reflected and transmitted light each contains a substantial amount of non-polarized light for rays within said wide range of angles of incidence.

2. System according to claim 1 wherein the medium of at least one low index layer is lead fluoride.

3. System according to claim 1 wherein the medium of at least one low index layer is silicon monoxide.

4. Optical system according to claim 1 wherein the medium of at least one high index layer is zinc sulphide.

5. Optical system according to claim 1 wherein the medium of at least one high index layer is titanium dioxide.

6. A color selective optical system for producing reflected and transmitted light beams each containing a substantial amount of non-polarized light, comprising a light-transmitting body having an outer light-admitting surface serving as an entrance face for receiving rays inclined thereto within a comparatively wide range of angles of incidence; an outer light-discharging surface at a substantial inclination to said light-admitting surface; between said outer surfaces two juxtaposed interior surfaces at a substantial inclination to said outer surfaces; and between said interior surfaces an optical interference coating, said coating having a plurality of alternate layers of optical media of respectively high and low refractive indexes, for reflecting light within one spectral range and for transmitting light within another spectral range, the refractive index of the optical medium of each low index layer being greater than said refractive index of said body, and the refractive index of the optical medium of the high index layers being substantially higher than that of said low index medium, the interference layers with said indexes greater than the index of said body reflecting a beam within said one spectral range and transmitting a beam within said other spectral range, essentially without total reflection, and at angles smaller than the angles of total reflective polarization; whereby the reflected and transmitted light each contains a substantial amount of non-polarized light for rays within said wide range of angles of incidence.

7. A color selective optical system for producing reflected and transmitted light beams each containing a substantial amount of non-polarized light, comprising a light-transmitting body of a certain index of refraction having an outer light-admitting surface serving as an entrance face for receiving rays inclined thereto within a comparatively wide range of angles of incidence; and an interior surface at a substantial inclination to said outer surface, and a second light-transmitting body of a certain index of refraction having an interior surface juxtaposed to said interior surface of said first body and an outer light-discharging surface at a substantial inclination to said interior surfaces, and between said interior surfaces an optical interference coating, said coating having a plurality of alternate layers of optical media of respectively high and low refractive indexes, for reflecting light within one spectral range and for transmitting light within another spectral range, the refractive index of the optical medium of each low index layer being greater than the refractive index of the body which has the higher refractive index, and the refractive index of the optical medium of the high index layers being substantially higher than that of said low index medium, the interference layers with said indexes greater than the index of said body reflecting a beam within said one spectral range and transmitting a beam within said other spectral range, essentially without total reflection, and at angles smaller than the angles of total reflective polarization; whereby the reflected and transmitted light each contains a substantial amount of non-polarized light for rays within said wide range of angles of incidence.

8. A color selective optical system for producing reflected and transmitted light beams each containing a substantial amount of non-polarized light, comprising a light-transmitting body of a certain refractive index having two surfaces at a substantial inclination to each other, one surface serving as an entrance face for receiving rays inclined thereto within a comparatively wide range of angles of incidence, and the other surface carrying an optical interference coating, said coating having a plurality of alternate layers of optical media of respectively high and low refractive indexes, for reflecting light within one spectral range and for transmitting light within another spectral range, the refractive index of the optical medium of each low index layer being greater than said refractive index of said body and said medium being lead fluoride for at least one of said low index layers, and the refractive index of the optical medium of the high index layers being substantially higher than that of said low index medium, the interference layers with said indexes greater than the index of said body reflecting a beam within said one spectral range and transmitting a beam within said other spectral range, essentially without total reflection, and at angles smaller than the angles of total reflective polarization; whereby the reflected and transmitted light each contains a substantial amount of non-polarized light for rays within said wide range of angles of incidence.

9. A color selective optical system for producing reflected and transmitted light beams each containing a substantial amount of non-polarized light, comprising a light-transmitting body having an outer light-admitting surface serving as an entrance face for receiving rays inclined thereto within a comparatively wide range of angles of incidence, an outer light-discharging surface at substantially right angles to said light-admitting surface; between said outer surfaces two juxtaposed interior surfaces which substantially bisect said outer surfaces; and between said interior surfaces an optical interference coating, said coating having a plurality of alternate layers of optical media of respectively high and low refractive indexes, for reflecting light within one spectral range and for transmitting light within another spectral range, the refractive index of the optical medium of each low index layer being greater than said refractive index of said body and said medium being lead fluoride for at least one of said low index layers, and the refractive index of the optical medium of the high index layers being substantially higher than that of said low index medium, the interference layers with said indexes greater than the index of said body reflecting a beam within said one spectral range and transmitting a beam within said other spectral range, essentially without total reflection, and at angles smaller than the angles of total reflective polarization; whereby the reflected and transmitted light each contains a substantial amount of non-polarized light for rays within said wide range of angles of incidence.

References Cited in the file of this patent

UNITED STATES PATENTS

| Number | Name | Date |
| --- | --- | --- |
| 2,392,978 | Dimmick | Jan. 15, 1946 |
| 2,399,860 | Dimmick | May 7, 1946 |
| 2,412,496 | Dimmick | Dec. 10, 1946 |
| 2,418,627 | Dimmick | Apr. 8, 1947 |
| 2,422,954 | Dimmick | June 24, 1947 |
| 2,490,263 | Gaiser et al. | Dec. 6, 1949 |
| 2,519,545 | Colbert et al. | Aug. 22, 1950 |
| 2,552,184 | Kock | May 8, 1951 |
| 2,589,930 | Dimmick et al. | Mar. 18, 1952 |